United States Patent
Ranganathan et al.

(10) Patent No.: US 11,138,240 B2
(45) Date of Patent: Oct. 5, 2021

(54) PERSONALIZED AUTOMATIC TAGGING

(71) Applicant: SAMSUNG ELECTRONICS CO., LTD., Suwon-si (KR)

(72) Inventors: Ashok Ranganathan, Greater Noida West (IN); Vipul Gupta, Hisar (IN); Rahul Agrawal, Gwalior (IN); Kalgesh Singh, New Delhi (IN); Kamya Jaiswal, Allahabad (IN); Arnav Aima, Tammu (IN); Abhinav Gaba, HUDA Panipat (IN); Arjun Kumar Agrawal, Pargarh (IN); Magendra Singh, Delhi (IN); Ekansh Garg, Hisar (IN); Tarunesh Kumar Gupta, Alwar (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 175 days.

(21) Appl. No.: 16/122,451

(22) Filed: Sep. 5, 2018

(65) Prior Publication Data
US 2019/0073412 A1 Mar. 7, 2019

(30) Foreign Application Priority Data
Sep. 5, 2017 (IN) .............................. 201741031462

(51) Int. Cl.
*G06F 16/903* (2019.01)
*G06F 16/28* (2019.01)
(Continued)

(52) U.S. Cl.
CPC .......... *G06F 16/287* (2019.01); *G06F 16/907* (2019.01); *G06F 16/9035* (2019.01); *G06F 16/90344* (2019.01)

(58) Field of Classification Search
CPC ................. G06F 16/287; G06F 16/907; G06F 16/90344; G06F 16/9035
See application file for complete search history.

(56) References Cited

U.S. PATENT DOCUMENTS 8,122,020 B1 2/2012 Donsbach et al.
9,063,811 B2 6/2015 Stekkelpak et al.
(Continued)

FOREIGN PATENT DOCUMENTS

JP 2002351797 A 12/2002

OTHER PUBLICATIONS

Andy Betts, "Launch Application on Your Android Phone", Published Dec. 16, 2016, Retrieved from Internet on Aug. 30, 2018, Total 10 pages, URL: http://www.makeuseof.com/tag/top-5-ways-find-launch-applicationsandroid-phone/.
(Continued)

*Primary Examiner* — Grace Park
(74) *Attorney, Agent, or Firm* — Sughrue Mion, PLLC

(57) ABSTRACT

A method and a device for personalized automatic tagging are provided. The method includes obtaining a plurality of context-based tags based on interactions between a user of the electronic device and a plurality of data items on the electronic device. The obtained plurality of context-based tags are associated with the plurality of data items. In response to detecting at least one context-based search input, at least one context-based tag corresponding to the at least one context-based search input is determined. At least one data item associated with the at least one context-based tag identified. A display of the electronic device is caused to display the at least one data item to the user.

16 Claims, 15 Drawing Sheets

(51) Int. Cl.
    *G06F 16/907*    (2019.01)
    *G06F 16/9035*    (2019.01)

(56) References Cited

U.S. PATENT DOCUMENTS

| | | |
|---|---|---|
| 2006/0271520 A1 | 11/2006 | Ragan |
| 2009/0287669 A1 | 11/2009 | Bennett |
| 2012/0036507 A1* | 2/2012 | Jonnala ............... G06F 8/60 |
| | | 717/178 |
| 2012/0290434 A1* | 11/2012 | Moritz ............ G06Q 30/0261 |
| | | 705/26.7 |
| 2013/0191397 A1* | 7/2013 | Avadhanam ...... G06F 16/24578 |
| | | 707/748 |
| 2014/0250433 A1* | 9/2014 | Stekkelpak ............ G06F 8/62 |
| | | 717/176 |
| 2014/0365496 A1 | 12/2014 | Chung |
| 2016/0034512 A1 | 2/2016 | Singhal et al. |
| 2017/0177600 A1* | 6/2017 | Zhang ................... G06F 9/451 |
| 2018/0011868 A1* | 1/2018 | Allen .................. G06F 16/168 |

OTHER PUBLICATIONS

James Tiongson, "Mobile app marketing insights: How consumers really find and use your apps", Think with Google, Published May 2015, Retrieved from Internet on Aug. 30, 2018, Total 10 pages, URL: https://www.thinkwithgoogle.com/consumer-insights/mobileapp-marketing-insights/.
Communication dated Jul. 10,2020 issued by the Intellectual Property India in Indian Patent Application No. 201741031462.

\* cited by examiner

PERSONALIZED AUTOMATIC TAGGING

CROSS-REFERENCE TO RELATED APPLICATION(S)

This application is based on and claims priority under 35 U.S.C. § 119(a) from Indian Patent Application No. 201741031462, filed on Sep. 5, 2017, in the Indian Patent Office, the disclosure of which is incorporated by reference herein in its entirety.

BACKGROUND

1. Field

Methods, apparatuses, devices, and article of manufacture consistent with embodiments of the present disclosure relate to a personalized automatic tagging.

2. Description of the Related Art

An electronic device may include a plurality of applications to facilitate similar or substantially similar activities. For example, the applications may be shopping applications, e-commerce applications, or the like. To execute a certain application on the electronic device, a user of the electronic device may click or tap an icon of the application or access the application through a file path. It may take some time to find the icon of the application, so the user may input a name of the application in the electronic device to search for the application.

However, the user may forget the name of the application, so the user may refer to a list of all the installed applications to find the application, which results in inconvenience.

When the electronic device includes various applications for "shopping", most of the time a user may use only one or two applications and forget about other shopping applications, which renders the other shopping applications redundant. Furthermore, to buy a specific product by online shopping through the electronic device, the user may search an application list for a certain application for buying the product, and then open the application to search for the product in the application, which involves at least two searches.

SUMMARY

It is an aspect to address at least the above-mentioned problems and/or disadvantages and to provide at least the advantages described below.

According to an embodiment, there is provided a method comprising: obtaining a plurality of context-based tags based on interactions between a user of the electronic device and a plurality of data items on the electronic device; associating the obtained plurality of context-based tags with the plurality of data items; in response to detecting at least one context-based search input, determining at least one context-based tag corresponding to the at least one context-based search input; identifying at least one data item associated with the at least one context-based tag; and causing a display of the electronic device to display the at least one data item to the user.

According to an embodiment, there is provided an electronic device comprising: a display; and at least one processor configured to: obtain a plurality of context-based tags based on interactions between a user of the electronic device and a plurality of data items on the electronic device; associate the obtained plurality of context-based tags with the plurality of data items; in response to detecting at least one context-based search input, determine at least one context-based tag corresponding to the at least one context-based search input; identify at least one data item associated with the at least one context-based tag; and cause the display to display the at least one data item to the user.

According to an embodiment, there is provided a computer program product comprising a non-transitory computer readable storage medium having a computer readable program stored therein, the computer readable program, when executed on a computing device, causing the computing device to: obtain a plurality of context-based tags based on interactions between a user of the electronic device and a plurality of data items on the electronic device; associate the obtained plurality of context-based tags with the plurality of data items; in response to detecting at least one context-based search input, determine at least one context-based tag corresponding to the at least one context-based search input; identify at least one data item associated with the at least one context-based tag; and cause the display to display the at least one data item to the user.

BRIEF DESCRIPTION OF THE DRAWINGS

The above and other advantages of the embodiments will be more clearly understood from the following description taken in conjunction with the accompanying drawings, in which.

DETAILED DESCRIPTION

Figure 1A:
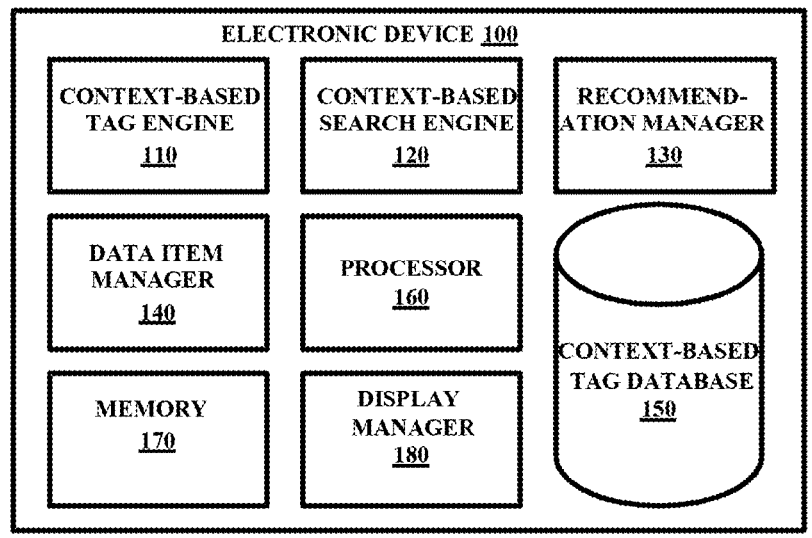
FIG. 1A is a block diagram of an electronic device according to an embodiment.

The following description with reference to the accompanying drawings is provided to assist in a comprehensive understanding of various embodiments of the disclosure as defined by the claims and their equivalents. The following description includes various specific details to assist in that understanding but these are to be regarded as merely exemplary. Accordingly, those of ordinary skill in the art will recognize that various changes and modifications of the various embodiments described herein may be made without departing from the scope and spirit of the disclosure as defined in the appended claims. In addition, descriptions of well-known functions and constructions may be omitted for clarity and conciseness.

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the embodiments. Furthermore, the one or more elements may have been represented in the drawings by various symbols, and the drawings may show only those specific details that are pertinent to understanding the embodiments of the disclosure so as not to obscure the drawings with details that will be readily apparent to those of ordinary skill in the art having benefit of the description herein.

The terms and words used in the following description and claims are not limited to the bibliographical meanings, but, are merely used by the inventors to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. Additionally, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Moreover, various functions described below may be implemented or supported by one or more computer programs, each of which may be formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data may be permanently stored and media where data may be stored and later overwritten, such as a rewritable optical disc or an erasable memory device.

The term "unit", "manager", "engine", or "device" may refer to a unit which processes at least one function or operation and may be implemented by hardware, software, or a combination of hardware and software.

To buy a specific product by online shopping through the electronic device, the user may search an application list for a certain application for buying the product, and then open the application to search for the product in the application, which involves at least two searches. According to an embodiment, the user may navigate directly to the product searched in the application by a single search.

Furthermore, the user may use a task reminder application to remind theirself of tasks that needs to be undertaken. According to an embodiment, when the user set a reminder to 'buy a watch' in the task reminder application, an application for buying the watch may be suggested to a user, and the application may show the watch as a search result when opened by the user.

An embodiment may provide a way to perform a given task related to any text context directly by suggesting an application needed to perform the given task without searching for the application to perform the given task. For example, when the user is having a conversation with another user about travelling by a bus, an application for booking the bus may be suggested to the user.

According to an embodiment, an automatic tagging of the application installed on the electronic device may be performed based on the usage of the application, and the applications may be managed based on the context-based tag associated with a usage context of that application, which results in enhancing a search function. Accordingly, an enriched context-based tagging of the applications installed on the electronic device may be provided, which results in creating a localized smarter application eco-system providing a more efficient way of searching, linking and categorization of the applications.

According to an embodiment, the process of searching for applications in the electronic device may be shortened. Further, different tasks may be associated with applications that would be suitable for undertaking the tasks as per the usage context of the applications.

According to an embodiment, native applications such as a contact application, a messaging application and or the like may be integrated with the tagged applications.

According to an embodiment, user effort may be reduced, and any action may be performed in quickly by reducing the number of steps of the process without redundant steps, thereby, enhancing user experience.

A user's to-do list may be analyzed, and each task may be appropriately matched with the corresponding application, to provide the task suggestion to the user, when the user uses the corresponding application, thereby, improving the user experience and completing the task without much effort.

According to an embodiment, application suggestions may be provided for the selected text in the electronic device, thereby, enhancing the user experience in terms of convenience of using the applications, swift operations on the applications and better sorted application tree in the electronic device. The burden of the user to remember the usage of every application installed in the electronic device may be reduced.

FIG. 1A is a block diagram of an electronic device according to an embodiment.

The electronic device 100 may be, for example but not limited to, a mobile phone, a smartphone, a Personal Digital Assistant (PDA), a tablet, a wearable device, a display device, an Internet of things (IoT) device, or the like.

Referring to FIG. 1A, the electronic device 100 may include a context-based tag engine 110, a context-based search engine 120, a recommendation manager 130, a data item manager 140, a context-based tag database 150, a processor 160, a memory 170 and a display manager 180, but is not limited thereto.

In an embodiment, the context-based tag engine 110 may be configured to create a context-based tag for a data item. The data item may be, for example but not limited to, an application (such as an instance messaging application, a chat application, a social network application, a contact application, a task-reminder application, a to-do list application, or the like), a notification from the application, a notification information, a contact, a to-do-list, a message, an email, a task, a schedule, or the like. The data item may indicate any item which can be found by integrated search in the electronic device 100. The data item may be displayed on a screen of the electronic device 100 such that a user may interact with the data item by clicking or touching the data item, or based on user voice. Various embodiments of the present disclosure are explained with the data item being assumed to be an application or icon representative thereof.

In an embodiment, the context-based tag may be created by extracting and pruning a keyword associated with a data item from a data item source and validating the keyword. The data item source may be, for example but not limited to, an app (application) store, a play store, an application description, meta information including a Meta tag or the like, when the data item is an application. The keyword may include at least one character, at least one word, at least one phrase, at least one clause, at least one sentence, at least one paragraph, but is not limited thereto.

In an embodiment, the context-based tag may be created by extracting a keyword input or browsed by a user in the data item such as an application, and by validating the keyword based on a result retrieved in the data item for the keyword. For example, when a user inputs a keyword of 'pizza' in a shopping application and the shopping application fails to retrieve a search result regarding pizza, a context-based tag may not be created, or the keyword of 'pizza' may be disassociated from the shopping application.

In an embodiment, the context-based tag may be obtained by extracting a keyword from at least one portion of the data item displayed on a screen of the electronic device 100. The keyword may be extracted using at least one of an image processing technique, a text mining technique, a machine learning technique, and Natural Language Processing (NLP) technique.

In an embodiment, the context-based tag may be obtained by extracting a keyword from a notification from an application.

In an embodiment, the context-based tag may be obtained by extracting a keyword from a conversation which is conducted in a messaging application.

In an embodiment, the context-based tag may be obtained by detecting a usage of the data item by the user. The context-based tag may be obtained based on an application utility, a user's usage patterns, or user's manual tagging.

In an embodiment, the context-based tag may be obtained based on a tag fetched from a data item source such as a play store, app descriptions, and meta information including the Meta tag.

After obtaining the context-based tag for the data item, the context-based tag engine 110 may associate the context-based tag to the data item. The context-based tag may be associated to the data item automatically after the context-based tag for the data item is obtained.

In an embodiment, multiple tags may be associated with a single data item, and a single tag may be associated to multiple data items.

After associating the context-based tag with the data item, if the electronic device receives an input from a user, the context-based search engine 120 may determine at least one context-based tag corresponding to the input. The input may be received at the electronic device 100 for integrated search, for example, the input may be inserted in an integrated search bar in the electronic device 100 by the user. The input may be referred to as a context-based search input in the present disclosure.

In an embodiment, the context-based search input may include at least a portion of text selected in the data item, or a keyword provided or input in the data item, for example, a task provided in a task reminder application. The text may be at least a portion of, for example, but not limited to, notes, messages, email, web pages or the like.

Based on the determination of the at least one context-based tag corresponding to the context-based search input, the context-based search engine 120 may identify at least one data item that is associated with the determined at least one context-based tag. Further, based on identifying the at least one data item, the context-based search engine 120 may display the identified at least one data item on the screen of the electronic device 100. A list including the identified at least one data item may be displayed.

Further, the context-based search engine 120 may open the data item and display a user interface showing search results retrieved based on the context-based tag or the context-based search input.

In another embodiment, the context-based search engine 120 may be configured to detect context of a first data item displayed on the screen of the electronic device 100 and determine additional context-based tag corresponding to the context of the first data item.

Based on the determined additional context-based tag corresponding to the context of the first data item, the context-based search engine 120 may identify a second data item associated with the determined additional context-based tag. After identifying the second data item associated with the determined additional context-based tag, the context-based search engine 120 may display the second data item on the screen of the electronic device 100. The second data item may be used to perform at least one operation corresponding to the context of the first data item.

In an embodiment, the context-based tag associated with the data item may be disassociated from the data item. For example, one ore context-based tag associated with the data item are displayed, and then at least one context-based tag may be disassociated from the data item when an input is detected on a graphical representation of the data item. The graphical representation may be, for example, an icon of an application, an application widget, or the like.

For example, a user may input a context-based search input of 'pizza' to a shopping application. Further, when the shopping application does not retrieve the pizza in a search result, the keyword 'pizza' may be disassociated from the shopping application.

In an embodiment, the recommendation unit 130 may be configured to recommend a list of data items based on the context-based tag provided by a user. In another embodiment, the recommendation unit 130 may be configured to recommend a data item based on data stored/noted in the to-do-list of the user. In another embodiment, the recommendation unit 130 may be configured to recommend an action or provide a notification to the user for triggering operations regarding the data item based on conversation conducted in a messaging application. Providing recommendation is further explained later by referring to the FIGS. 8B and 13.

In an embodiment, the data item manager 140 may be configured to manage various operations of data items in the electronic device 100.

In an embodiment, the context-based tag database 150 may store various context-based tags obtained by the context-based tag engine 110. Further, the context-based tag database 150 may be accessed by the context-based search engine 120 searching for a specific context-based tag.

In an embodiment, the processor 160 may be configured to communicate with and control all the elements in the electronic device 100 to perform functions of the elements. The processor 160 may consist of at least one processor.

In an embodiment, the memory 170 may include, but is not limited to a computer readable storage media such as various types of volatile and non-volatile storage media. Non-volatile storage elements may include magnetic hard discs, optical discs, floppy discs, flash memories, or forms of electrically programmable memories (EPROM) or electrically erasable and programmable (EEPROM) memories. In an embodiment, the memory 170 may include a cache or random-access memory (RAM) for the processor 160. The memory 170 may be separate from the processor 160. The memory 170 may be an external storage device, for example, a hard drive, a compact disc (CD), a digital video disc (DVD), a memory card, a memory stick, a universal serial bus (USB) memory, but is not limited thereto. In addition, the memory 170 may, in some examples, be considered as a non-transitory storage medium. The term "non-transitory" may indicate that the storage medium is not embodied in a carrier wave or a propagated signal. However, the term "non-transitory" should not be interpreted that the memory 170 is non-movable. The memory 170 may store instructions executable by the processor 160 to perform functions, acts, tasks, operations described herein.

In an embodiment, the display manager 180 may be configured to display a data item on the screen of the electronic device 100.

In an embodiment, the electronic device 100 may include fewer or more components than those illustrated in FIG. 1A. Further, names of the components are used only for illustrative purpose. One or more components may be combined to perform a same or substantially similar function to manage the operation in the electronic device 100.

Figure 1B:
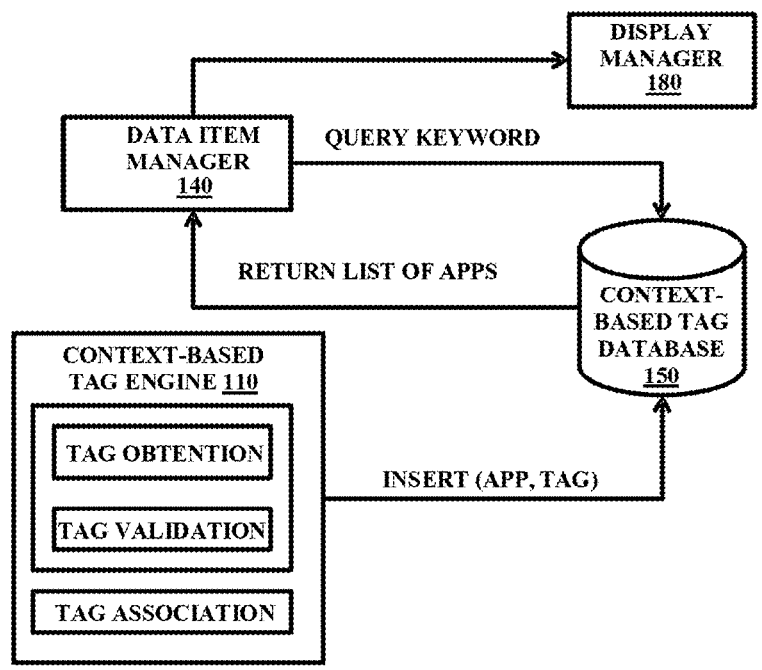
FIG. 1B is a diagram for explaining functions a context-based tag engine according to an embodiment.

FIG. 1B is a diagram for explaining functions a context-based tag engine according to an embodiment.

Referring to FIG. 1B, the data item manager 140 may send a keyword related to a data item (extracted as explained by referring to FIG. 1A) to the context-based tag database 150 to determine if the extracted keyword is stored as at least a part of a context-based tag in the context-based database 150.

When the keyword is already stored as the context-based tag in the context-based tag database 150, the context-based tag database 150 returns a list of data items associated with the context-based tag to the data item manager 140, and the list may be displayed on a screen of the electronic device 100 by the display manager 180.

When the keyword is not stored as the context-based tag, that is, the context-based tag database 150 returns an empty list to the data item manager, the context-based tag engine 110 may obtain a context-based tag based on the keyword, validate the context-based tag, for example, by determining whether the data item returns a search result regarding the keyword, and then associates the context-based tag to the data item. Further, the context-based tag is stored in the context-based tag database 150.

Figure 2A:
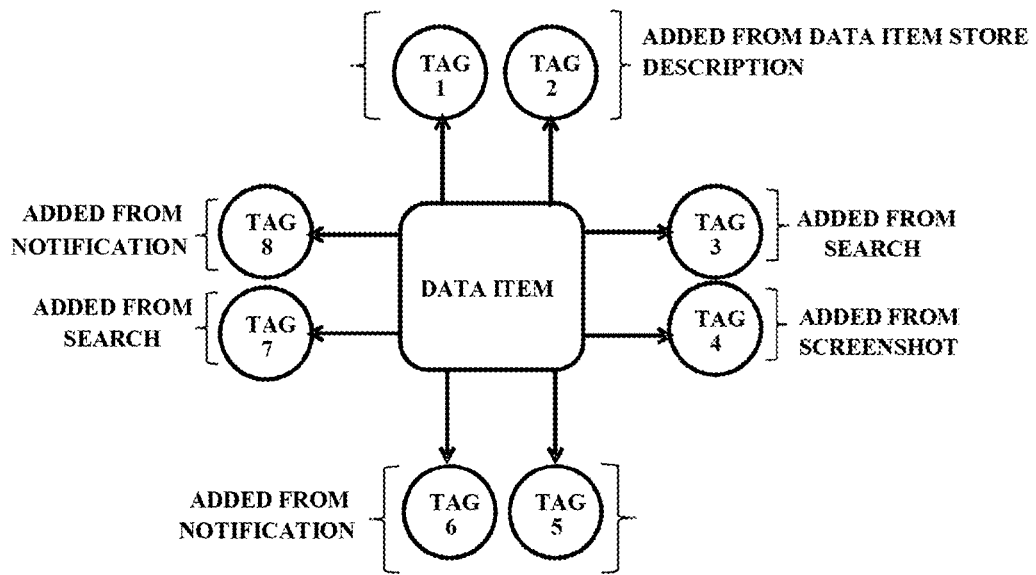
FIG. 2A is a diagram for explaining a method of tagging a data item according to an embodiment.

FIG. 2A is a diagram for explaining a method of tagging a data item according to an embodiment.

Referring to FIG. 2A, context-based tags TAG 1 and TAG 2 are obtained by extracting a keyword from a data item store which provides description of the data item. Related keywords may be further extracted from and pruned to obtain the context-based tag. Explanation of obtaining the context-based tags based on the extracted keyword from the data item store will be described later by referring to FIG. 4.

Context-based tags TAG 3 and TAG 7 are obtained by extracting a keyword input in the data item, for example, a search bar of the data item. Explanation of obtaining the context-based tags based on the extracted keyword input in the data item will be described later by referring to FIG. 5A.

Context-based tag TAG 4 is obtained by extracting a keyword from a search result of the data item displayed on a screen. Here, the search result displayed on the screen may be image-processed for keyword extraction. Explanation of obtaining the context-based tag based on the image-processing will be described later by referring to FIG. 6A.

Context-based tags TAG 5, TAG 6 and TAG 8 are obtained by extracting a keyword from a notification pushed from the data item at the electronic device. Explanation of obtaining the context-based tags based on the extracted keyword from the notification will be described later by referring to FIG. 7A.

In an embodiment, context-based tags may be obtained based on interaction between a user and an application as explained above.

According to an embodiment, obtained tags may be further used to refine application search results by providing a means to search a task or entity and displaying all the associated applications, thereby, improving user experience.

Figure 2B:
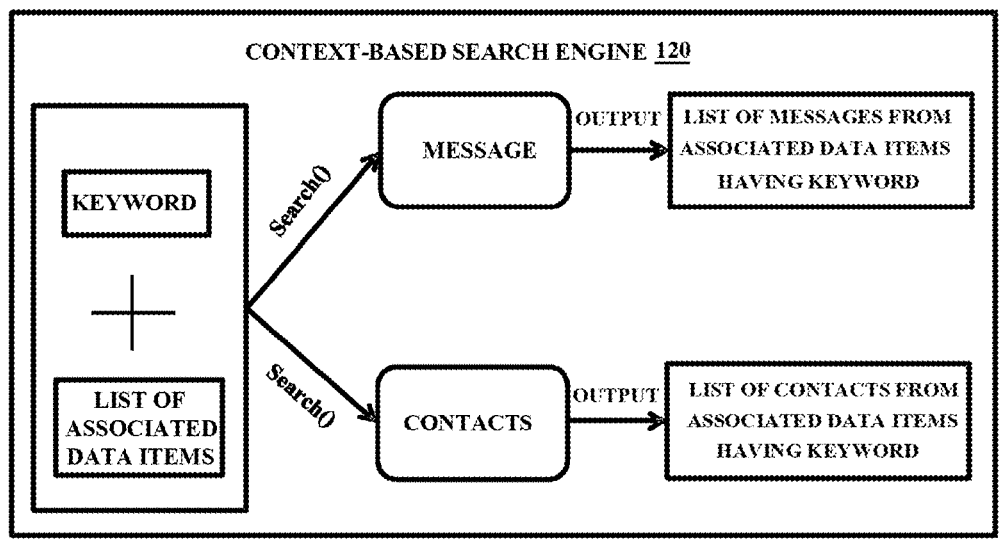
FIG. 2B is a diagram for explaining a method of searching for a data item based on a context-based tag according to an embodiment.

FIG. 2B is a diagram for explaining a method of searching for a data item based on a context-based tag, according to an embodiment.

The context-based search engine 120 may determine a data item that is associated with a keyword input in an electronic device by a user. For example, the keyword may be input in the electronic device for integrated search which is used in the electronic device to search for a relevant data item, for example, an application, a message, an email, a notification from an application, a task, a schedule, etc.

When a user wants to access a payment application to recharge their account, the user may input a text or a voice of 'recharge' in an integrated search bar of the electronic device 100. Based on an input of 'recharge', the context-based search engine 120 may provide a list of applications tagged with 'recharge', according to an embodiment. Here, the applications may have been tagged with a context-based tag including a text of 'recharge'.

When a user wants to order a book using a shopping application in their electronic device, the user needs to find and open an appropriate shopping application in the electronic device for buying the book first, search for the book, and then, order the book by selecting the book in a search result. This process of buying a single book involves many steps by the user in a conventional system.

According to an embodiment, an appropriate application may be conveniently found in an electronic device. For example, when many shopping applications or multi-purpose applications are installed in the electronic device, and at least one shopping application selling books have been tagged with a context-based tag of "book", a user may just enter a query of "book" in an integrated search bar of the electronic device to find an appropriate shopping application for buying the book.

Figure 3:
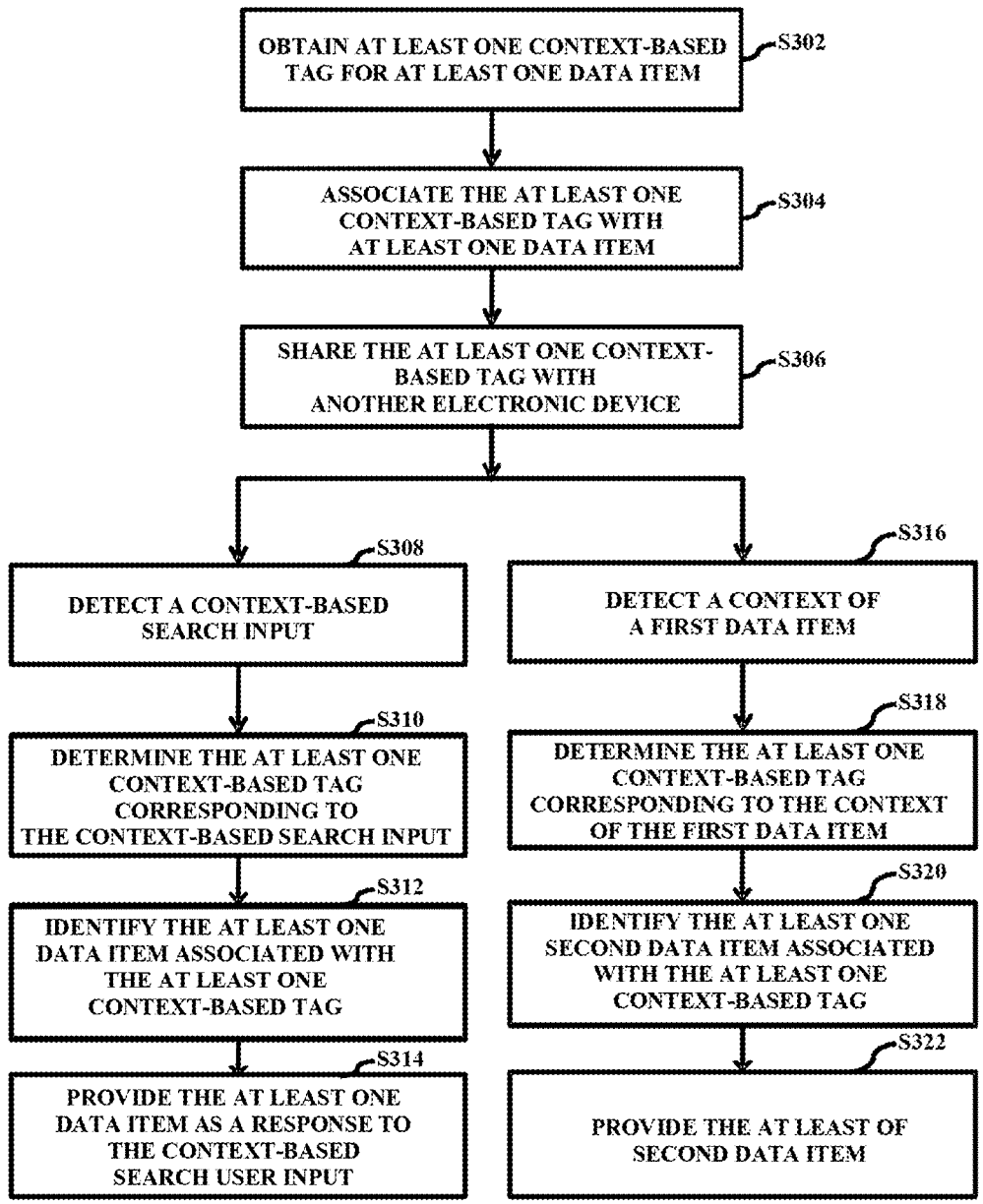
FIG. 3 is a flowchart of a method of using a context-based tag for a data item according to an embodiment.

FIG. 3 is a flowchart of a method of using a context-based tag for a data item according to an embodiment.

Referring to FIG. 3, at S302, at least one context-based tag may be obtained for at least one data item.

At S304, the obtained at least one context-based tag may be associated with the at least one data item. The at least one data item may be tagged with the obtained at least one context-based tag.

At S306, the associated at least one context-based tag may be shared with another electronic device. In an embodiment, the associated context-based tag may be shared with another electronic device using a short-range communication (e.g., near field communication, Bluetooth communication or the like).

At S308, a context-based search input may be detected.

At S310, at least one context-based tag corresponding to the context-based search input may be determined. The determined at least one context-based tag may be the same as, included in, or including the at least one context-based tag obtained at S302, associated at S304, and shared at S306. That is, the context-based search input may be the same as, included in, or including the at least one context-based tag obtained at S302, associated at S304, and shared at S306.

At S312, at least one data item associated with the determined at least one context-based tag may be identified. When the determined at least one context-based tag or the context-based search input is the same as the at least one context-based tag obtained at S302, associated at S304, and shared at S306, the identified at least one data item may be the same as the at least one data item tagged at S304. When the determined at least one context-based tag or the context-based search input is included in the at least one context-based tag obtained at S302, associated at S304, and shared at S306, the number of the identified at least one data item may be greater than the number of the at least one data item tagged at S304. When the determined at least one context-based tag or the context-based search input including the at least one context-based tag obtained at S302, associated at S304, and shared at S306, the number of the identified at least one data item may be less than the number of the at least one data item tagged at S304.

At S314, the identified at least one data item may be provided as a response to the context-based search user input. For example, the identified at least one data item may be displayed on a screen of the electronic device.

At S316, a context of a first data item may be detected. Here, the first data item may indicate a communication with other users or a notification from an application but is not limited thereto.

At S318, at least one context-based tag corresponding to the context of the first data item may be determined.

At S320, at least one second data item associated with the determined at least one context-based tag may be identified.

At S322, the identified at least one second data item may be provided by the electronic device 100. The identified at least one second data item may be displayed on a screen of the electronic device 100.

Figure 4:
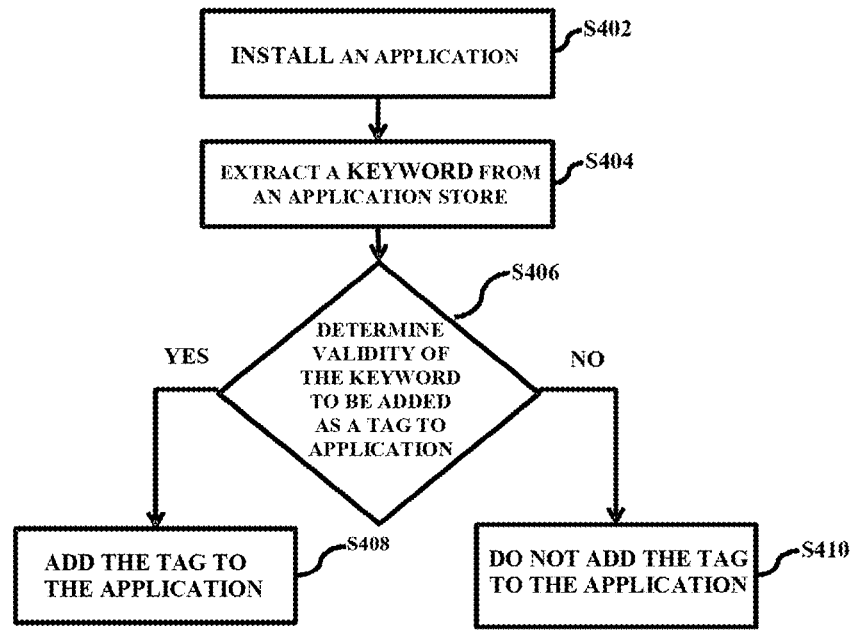
FIG. 4 is a flowchart of a method of obtaining a context-based tag for a data item based on extracting a keyword from a data item source according to an embodiment.

FIG. 4 is a flowchart of a method of obtaining a context-based tag for a data item based on extracting a keyword from a data item source according to an embodiment.

Referring to FIG. 4, at S402, an application may be installed on an electronic device. The application may be installed on the electronic device in response to an update of the application.

At S404, a keyword may be extracted from a data item source including an application store which provides description of the application. The keyword may be extracted from the description of the application. At S406, the validity of the keyword may be determined to be added as a context-based tag to the application. In an embodiment, a context-based tag engine of the electronic device may determine the validity of the keyword to be added as the context-based tag to the application.

If the keyword is valid as a context-based tag, at S408, the keyword may be associated with the application as a context-based tag. That is, the application may be tagged with the keyword. In an embodiment, a context-based tag engine of the electronic device may add the context-based tag to the application.

If the keyword is not valid as a context-based tag, at S410, the keyword is not associated with the application as a context-based tag.

In an embodiment, a context-based tag may be obtained by extracting and pruning a keyword from data item description provided by a data item source which includes a meta-tag provided by a data item developer, and a snapshot in the data item description.

When a shopping application is installed on an electronic device, a context-based tag of 'shopping' may be obtained by extracting a keyword from the description of the shopping application at the application store. Further, whether the context-based tag is valid may be determined. When it is determined that the context-based tag is valid, the context-based tag of 'shopping' may be stored in the context-based tag database 150 for the shopping application.

Figure 5A:
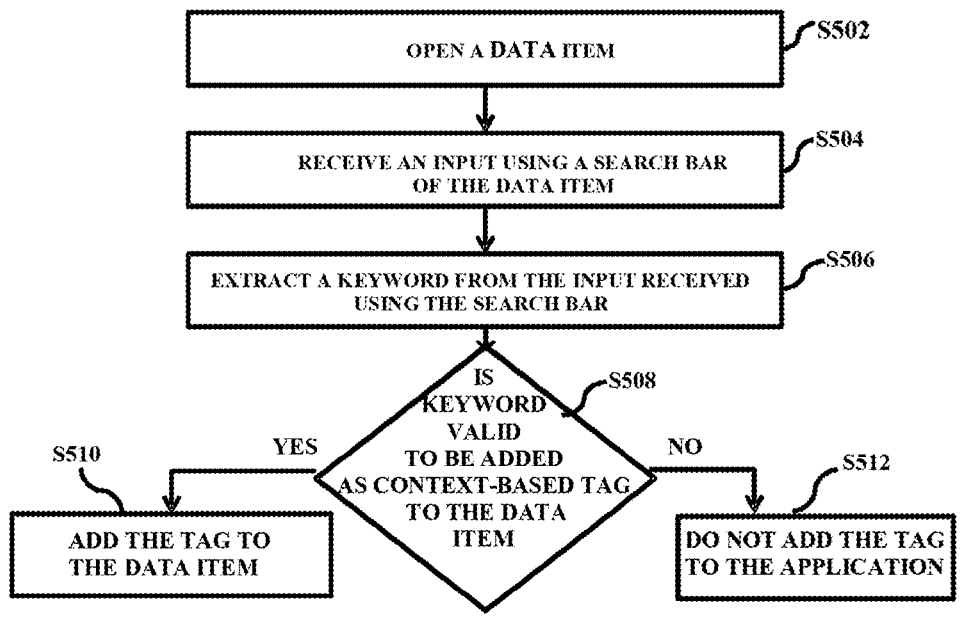
FIG. 5A is a flowchart of a method of obtaining a context-based tag for a data item based on extracting a keyword in a search bar according to an embodiment.

FIG. 5A is a flowchart of a method of obtaining a context-based tag for a data item based on extracting a keyword received using a search bar according to an embodiment.

Referring to FIG. 5A, at S502, a data item may be opened, for example, accessed, in an electronic device by a user.

At S504, an input may be received using a search bar of the data item. For example, the input may be a text indicating a product in sale when the data item is a shopping application.

At S506, a keyword may be extracted from the input received using the search bar.

At S508, the validity of the keyword may be determined to be added as a context-based tag to the data item.

When the keyword is valid as a context-based tag for the data item, at S510, the keyword may be added to the data item as the context-based tag. When the keyword is not valid as a context-based tag for the data item, at S512, they keyword may not be added to the data item as the context-based tag.

Figure 5B:
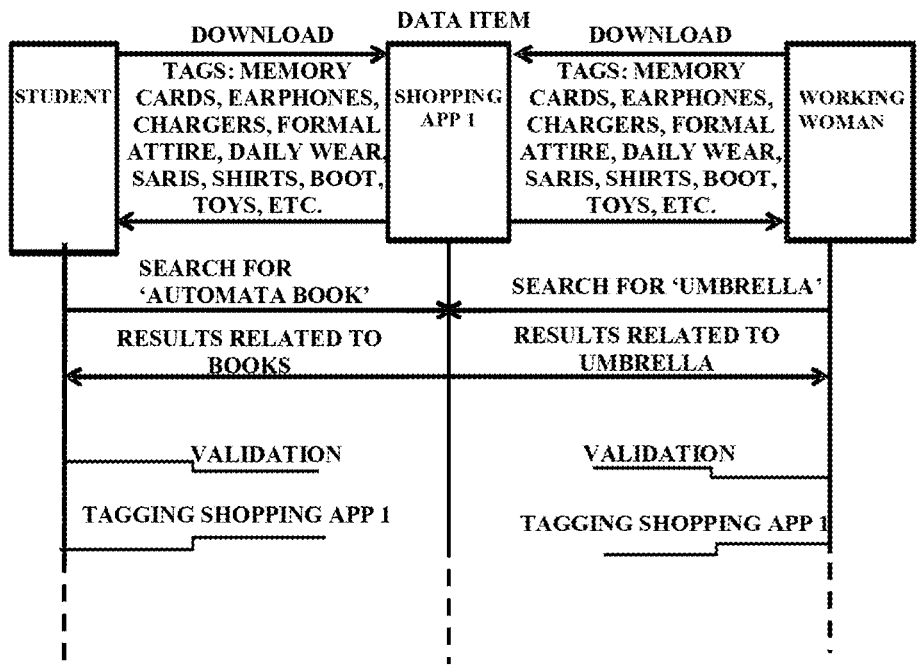
FIG. 5B is a flowchart of method of obtaining a context-based tag for a data item based on extracting keyword received using a search bar according to an embodiment.

FIG. 5B is a flowchart of method of obtaining a context-based tag for a data item based on extracting keyword using a search bar according to an embodiment.

Referring to the FIG. 5B, a data item is 'Shopping App 1.' Two different users, a student and a working woman may download 'Shopping App 1' in their electronic devices.

The student may search for 'Automata Book' using a search bar of Shopping App 1 in his electronic device. A keyword of 'Book' may be extracted from an input entered by the student, and the validity of the keyword of 'Book' may be determined to be added as a context-based tag for Shopping App 1 in the student's electronic device. When the keyword of 'Book' is added as a context-based tag to Shopping App 1, the context-based tag may be stored in a context-based tag database of the student's electronic device. Further, the student may search for other items (e.g., a TV, a pen, memory cards or the like) using a search bar of Shopping App 1, and these keyword for other items may also be stored as context-based tags for Shopping App 1.

The working woman may search for 'Umbrella' using a search bar of Shopping App 1 in her electronic device. A keyword of 'Umbrella' may be extracted from an input entered by the working woman, and the validity of the keyword of 'Umbrella' may be determined to be added as a context-based tag for Shopping App 1 in the working woman's electronic device. When the keyword of "Umbrella" is added as a context-based tag to Shopping App 1, the context-based tag may be stored in a context-based tag database of the working woman's electronic device. Further, the working woman may search for other items (e.g., clips, a sari, a handbag or the like) using a search bar of Shopping App 1, and these keyword for other items may also be stored as context-based tags for Shopping App 1.

According to an embodiment, a personalized context-based tags for data items may be provided to users.

Figure 6A:
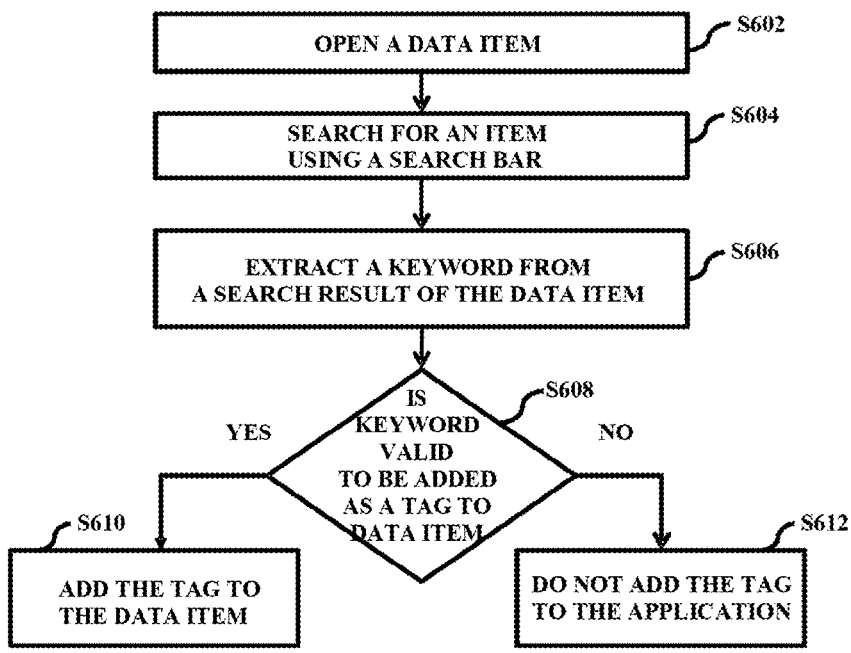
FIG. 6A is a flowchart of a method of obtaining a context-based tag for a data item based on a search result in the data item according to an embodiment.

FIG. 6A is a flowchart of a method of obtaining a context-based tag for a data item based on a search result in the data item according to an embodiment.

At S602, a data item may be opened in an electronic device by a user.

At S604, an item may be searched for using a search bar of the data item. In an embodiment, a context-based tag engine of the device may search for the item (e.g., product, or the like) using the search bar of the data item.

At S606, a keyword may be extracted from a search result retrieved by the data item. In an embodiment, the search result may be displayed on a screen of the device, and the displayed search result may be further image-processed for keyword extraction.

At S608, the validity of the keyword to be added as a context-based tag to the data item may be determined. When the keyword is valid as a context-based tag for the data item, at S610, the keyword may be added as a context-based tag to the data item.

When the keyword is not valid as a context-based tag for the data item, at S612, the keyword may not be added as a context-based tag for the data item.

Figure 6B:
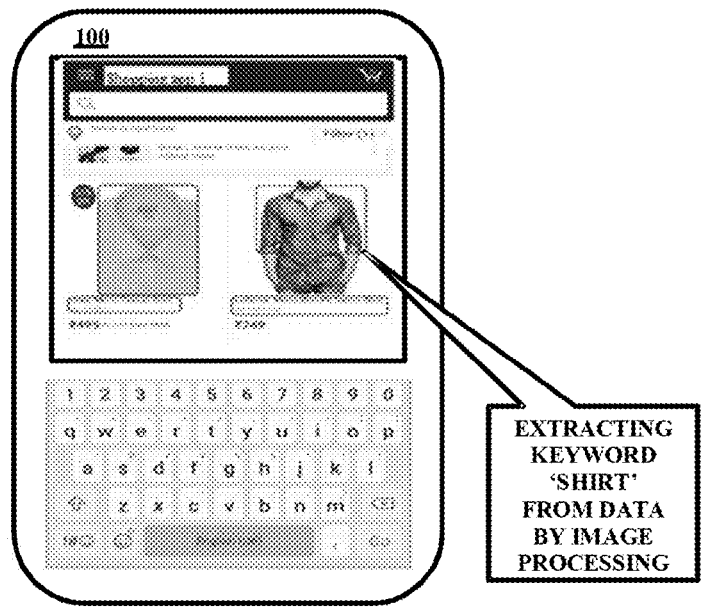
FIG. 6B is an example schematic user interface for explaining the method of FIG. 6A.

FIG. 6B is an example schematic user interface for explaining the method of FIG. 6A.

Referring to the FIG. 6B, 'Shopping app 1' is opened and displayed on an electronic device 100, and 'shirts for men' may be displayed on Shopping app 1 in response to searching or browsing by a user. The electronic device 100 may analyze a search result displayed by Shopping app 1 in response to searching by the user. The displayed search result contains shirts of different brands and price range, and a keyword of 'shirt' may be extracted from the search result using a text mining and image-processing. Further, the validity of the keyword of 'shirt' may be determined, and the context-based tag of 'shirt' may be obtained for Shopping app 1. Further, the context-based tag of 'shirt' may be associated with Shopping app 1 and stored.

Figure 7A:
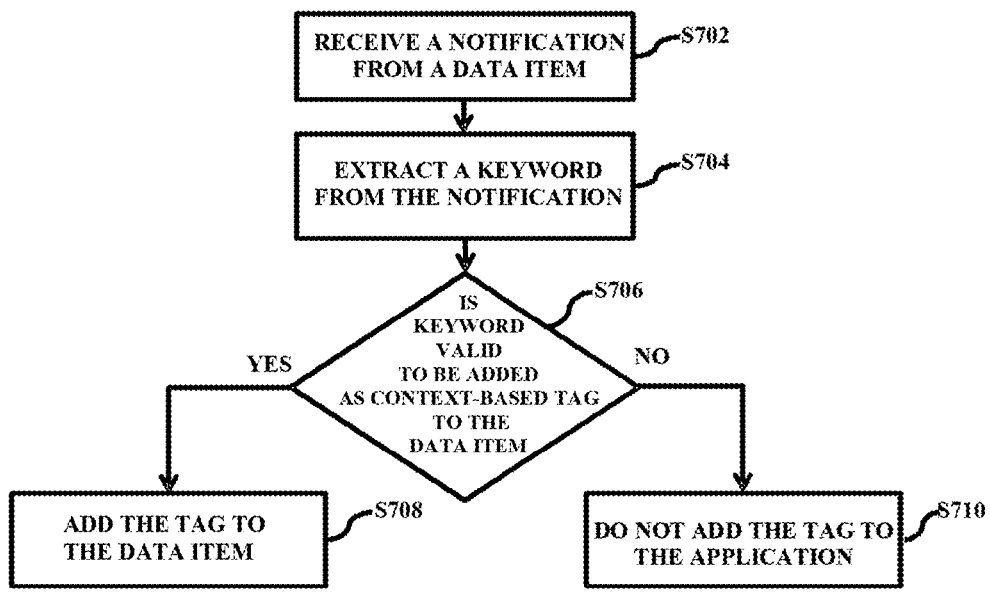
FIG. 7A is a flowchart of a method of obtaining a context-based tag for a data item based on extracting a keyword from a notification from the data item according to an embodiment.

FIG. 7A is a flowchart of a method of obtaining a context-based tag for a data item based on extracting a keyword from a notification from the data item according to an embodiment.

Referring to FIG. 7A, at S702, a notification may be received from a data item.

At S704, a keyword may be extracted from the notification.

At S706, the validity of the keyword to be added as a context-based tag to the data item may be determined.

When the keyword is valid as a context-based tag for the data item, at S708, the keyword may be added as a context-based tag to the data item.

When it is determined that the keyword is not valid as a context-based tag for the data item, at S710, the keyword may not be added as a context-based tag to the data item.

Figure 7B:
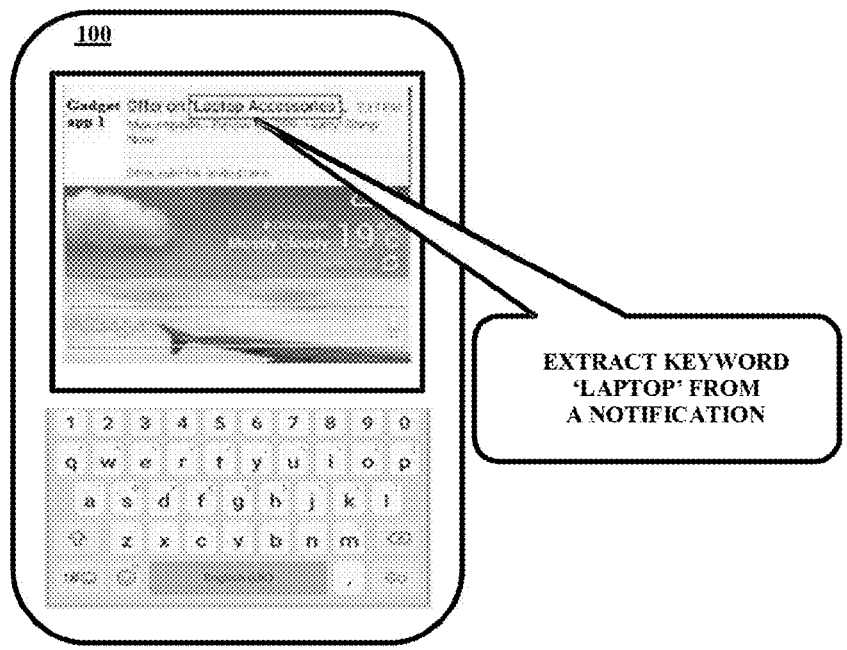
FIG. 7B is an example schematic user interface for explaining the method of FIG. 7A.

FIG. 7B is an example schematic user interface for explaining the method of FIG. 7A.

Referring to FIG. 7B, an electronic device 100 receives a notification from 'Gadget app 1' regarding offers on laptop accessories. The electronic device 100 may extract a keyword of 'Laptop' from the received notification of the Gadget app 1. Further, the electronic device 100 may determine the validity of the keyword and associate the keyword as a context-based tag to 'Gadget app 1'.

Figure 8A:
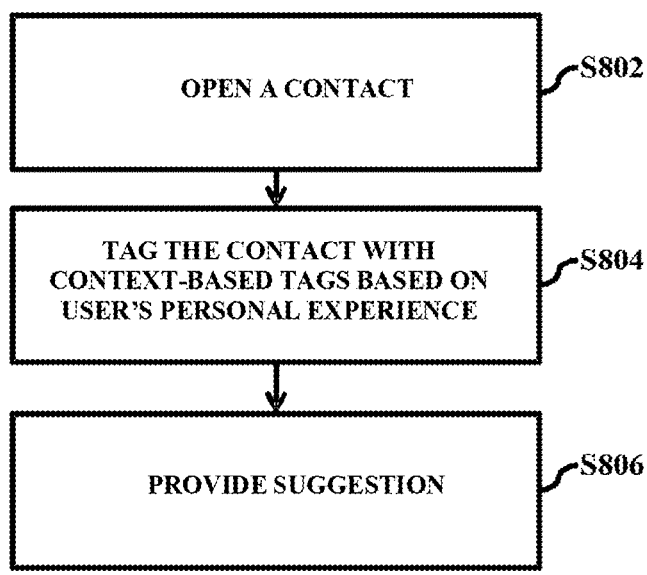
FIG. 8A is a flowchart of a method of obtaining a context-based tag for contacts, according to an embodiment.

FIG. 8A is a flowchart of a method of obtaining a context-based tag for contacts, according to an embodiment.

Referring to FIG. 8A, at S802, a contact is opened in an electronic device.

At S804, a contact may be tagged with a context-based tag based on user's communication with a person of the contact.

At S806, suggestion may be provided to the user. The suggestion may be provided when a corresponding application is opened.

Figure 8B:
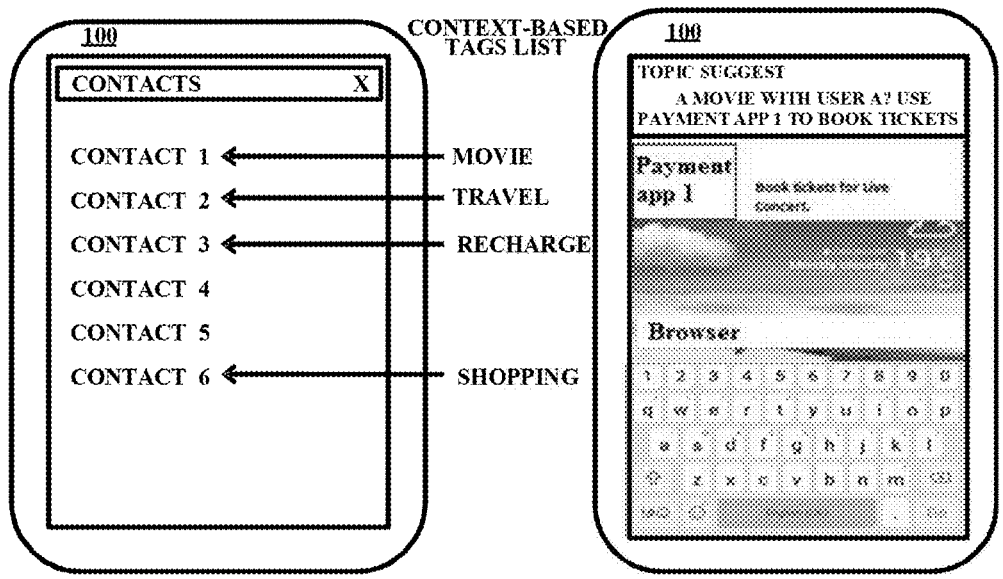
FIG. 8B is an example schematic user interface for explaining the method of FIG. 8A.

FIG. 8B is an example schematic user interface for explaining the method of FIG. 8A.

Referring to FIG. 8B, the electronic device 100 may tag users with context-based tags such as movie, travel, shopping, recharge etc. In an embodiment, context-based tags may be associated with other users based on communication between users. Context-based tags may be associated with other users based on a schedule, a memo, a task-reminder, etc. stored in user's electronic device. For example, when it is detected from communication between a user of Contact 1 using a message application that they have a plan of watching a movie, Contact 1 may be tagged with Movie. When the user opens an application which is tagged with Movie, for example, Payment app 1, in their electronic device 100, the application may provide a suggestion saying 'Planned for a movie with contact 1? Use Payment app 1 to book tickets based on the context-based tag of 'movie' associated with Contact 1 as shown in FIG. 8B.

In an embodiment, the user may manually assign tags to any contact. The tags may be used to provide suggestions to the user when the user communicate with people tagged with a context-based tag. For instance, when Contact 1 is tagged with "Movie" a notification saying, "Need to talk to B about Movies?" may be provided by the electronic device 100 when conversation or communication with Contact 1 is established in a messaging application.

In an embodiment, when a keyword of "recharge" is searched for in an electronic device, all the application tagged with the keyword of "recharge" may be provided or displayed by the electronic device. Furthermore, messages tagged with or including the keyword of "recharge" may be further provided by the electronic device.

Figure 9A:
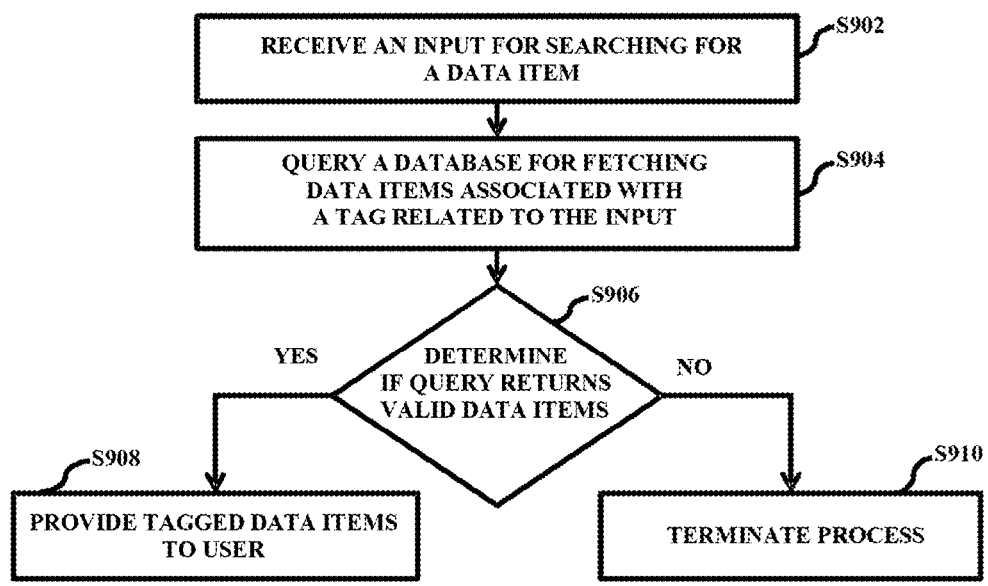
FIG. 9A is a flowchart of a method of searching for a data item based on a context-based tag, according to an embodiment.

FIG. 9A is a flowchart of a method of searching for a data item based on a context-based tag, according to an embodiment.

At S902, an input for searching for a data item may be received at an electronic device.

At S904, a context-based tag database may be queried for fetching data items associated with a tag related to the input.

At S906, whether the database query returns valid data items may be determined. When the database query returns valid data items, at S908, the tagged data items may be provided to the user on the electronic device.

When the database query does not return valid data items, at S910, the process may be terminated.

Figure 9B:
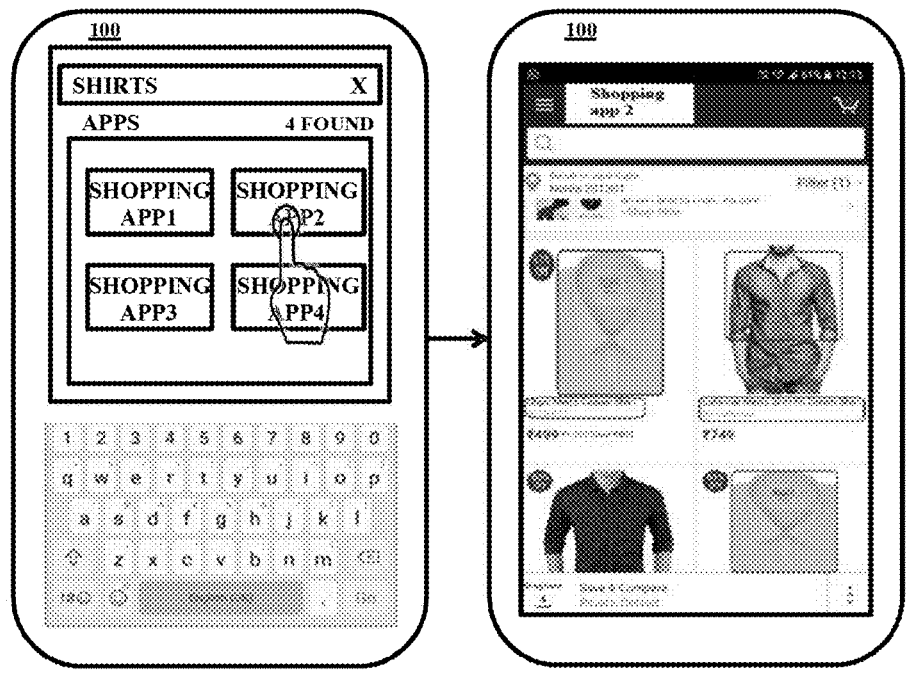
FIG. 9B is an example schematic user interface for explaining the method of FIG. 9A.

FIG. 9B is an example schematic user interface for explaining the method of FIG. 9A.

Referring to FIG. 9B, when a user wants to access the shopping applications selling shirts, the user may enter 'shirt' in an integrated search bar of the electronic device 100. The electronic device 100 may query a context-based database of the electronic device 100 to fetch applications associated with a context-based tag of 'shirt' and display a list of applications.

Further, as the user selects 'shopping app 2', the electronic device 100 may display a list of shirts searched by 'shopping app 2', without the user having to search for shirts again in 'shopping app 2', thereby, improving the user experience.

Figure 10A:
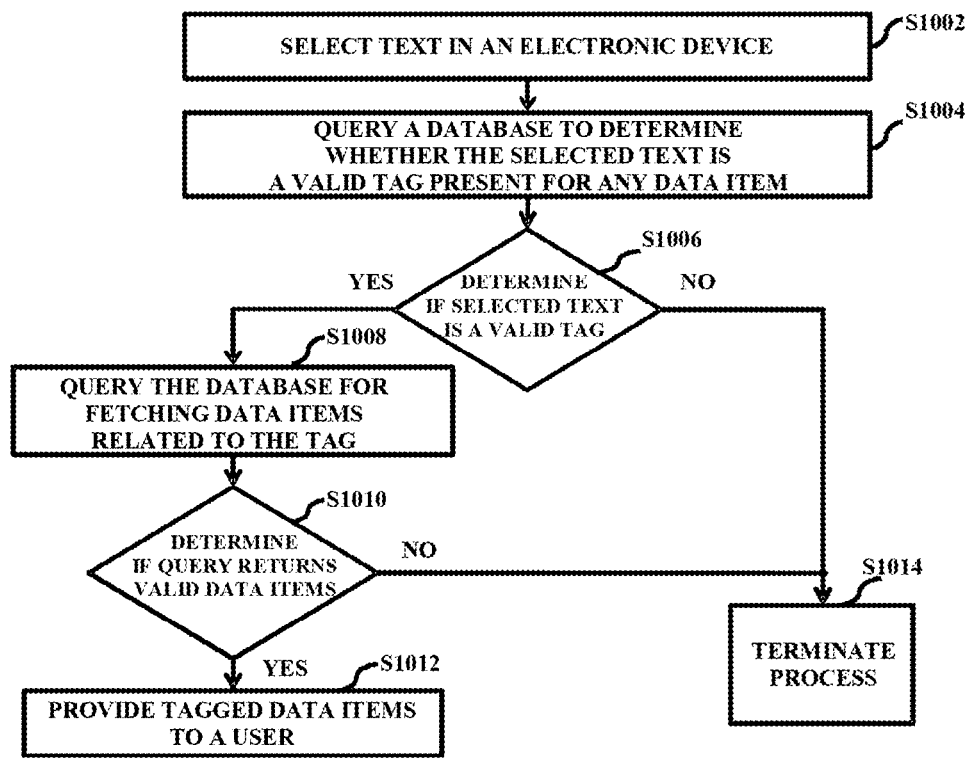
FIG. 10A is a flowchart of a method of searching for a data item based on a text selected in an electronic device according to an embodiment.

FIG. 10A is a flowchart of a method of searching for a data item based on a text selected in an electronic device according to an embodiment.

At S1002, a text may be selected in an electronic device.

At S1004, a context-based tag database may be queried to determine whether the selected text is a valid context-based tag present for any data item.

At S1006, whether the selected text is valid may be determined. When the selected text is not a valid as a context-based tag, at S1014, the process may be terminated.

When the selected text is valid as a context-based tag, at S1008, the context-based tag database may be queried for fetching data items related to the selected text, that is, the context-based tag.

At S1010, whether the context-based tag database query returns valid data items may be determined.

When the context-based tag database query returns valid data items, at S1012, tagged data items may be provided to a user.

When the context-based tag database query does not return valid data items, at S1014, the process may be terminated.

Figure 10B:
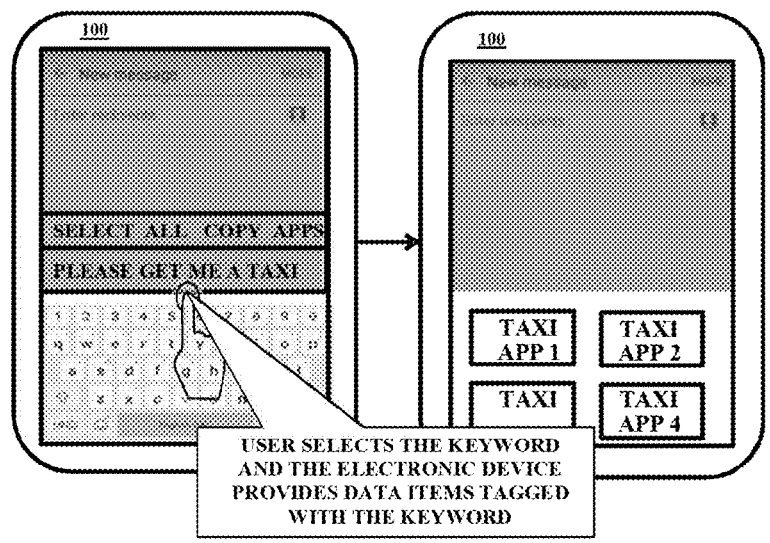
FIG. 10B is an example schematic user interface for explaining the method of FIG. 10A.

FIG. 10B is an example schematic user interface for explaining the method of FIG. 10A.

Referring to FIG. 10B, a first data item, for example, a messaging application is opened. A conversation with a contact is established in the messaging application. When a text of 'taxi' from a conversation in the messaging application, the electronic device 100 may search the context-based tag database 150 for 'taxi' to determine whether 'taxi' is the valid context-based tag. If the 'taxi' is a valid context-based tag, then the electronic device may provide a list of applications tagged with 'taxi'.

In an embodiment, an application may be suggested based on a selected text in an electronic device. For instance, when a text containing "Vegetables" is selected in the electronic device, then application tagged with "Vegetables" may be provided to a user.

Figure 11:
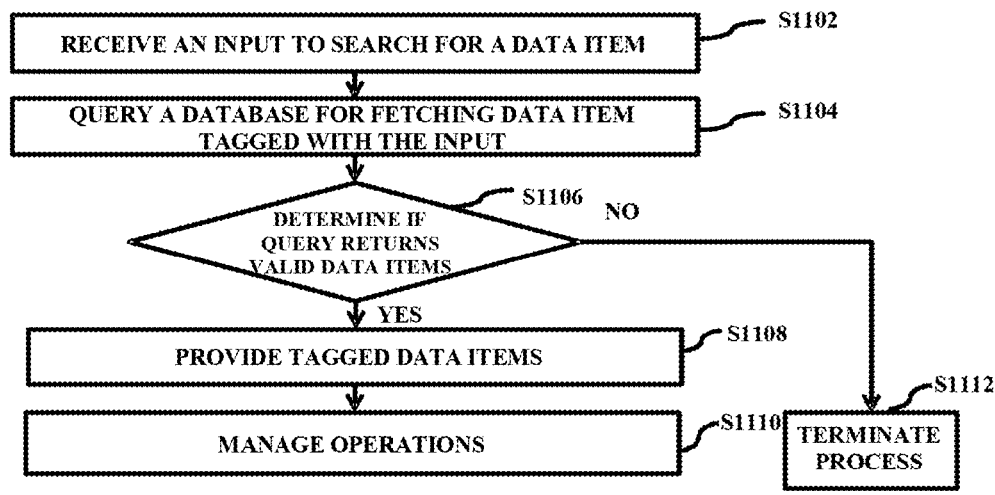
FIG. 11 is a flowchart of a method of accessing a data item based on a context search, according to an embodiment.

FIG. 11 is a flowchart of a method of accessing a data item based on a context search, according to an embodiment.

At S1102, an input to search for a data item may be received at an electronic device.

At S1104, a context-based tag database may be queried from the electronic device for fetching data items associated with a context-based tag related to the input.

At S1106, whether the database query returns valid data items may be determined. When the database query does not return valid data items, at S1112, the process may be terminated.

When the database query returns valid data items, at S1108, data items tagged with the context-based tag related to the input may be provided by the electronic device.

At S1110, operations, such as, opening the tagged data item, and searching for the context-based tag or the input in the tagged data item may be performed.

For example, when "Vegetables" is searched for using an integrated search bar in an electronic device, data items tagged with "Vegetables", such as, Vegetable app1, Vegetable app2, Vegetable app3, etc. may be displayed as a search result of an integrated search. When a certain application is selected by a user, the application may automatically show a result of "Vegetables" found in the application.

Figure 12:
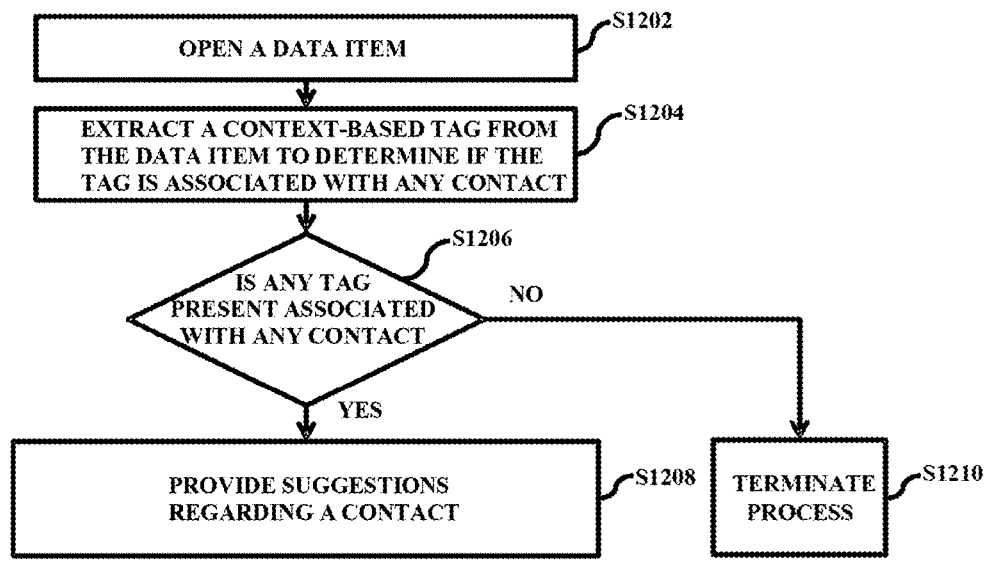
FIG. 12 is a flowchart of a method of providing suggestions based on a context-based tag, according to an embodiment.

FIG. 12 is a flowchart of a method of providing suggestions based on a context-based tag, according to an embodiment.

At S1202, a data item may be opened by a user.

At S1204, a context-based tag may be extracted from the data item to determine if the context-based tag is associated with any contact in the electronic device.

At S1206, whether any context-based tag present is associated with any contact in the electronic device may be determined. When none of the context-based tags obtained and stored in a context-based tag database is associated with any contact, at S1210, the process may be terminated.

When any of the context-based tags obtained and stored in the context-based tag database are associated with any contact, at S1208, suggestions regarding the contact may be provided. The suggestions may be provided when the data item is opened in the electronic device.

For example, contacts may be associated with context-based tags, and data items may be associated with the context-based tags. When a search corresponding to a certain context-based tag is entered in an electronic device, at least one contacts and at least one data item may be provided as a search result in the electronic device.

Figure 13:
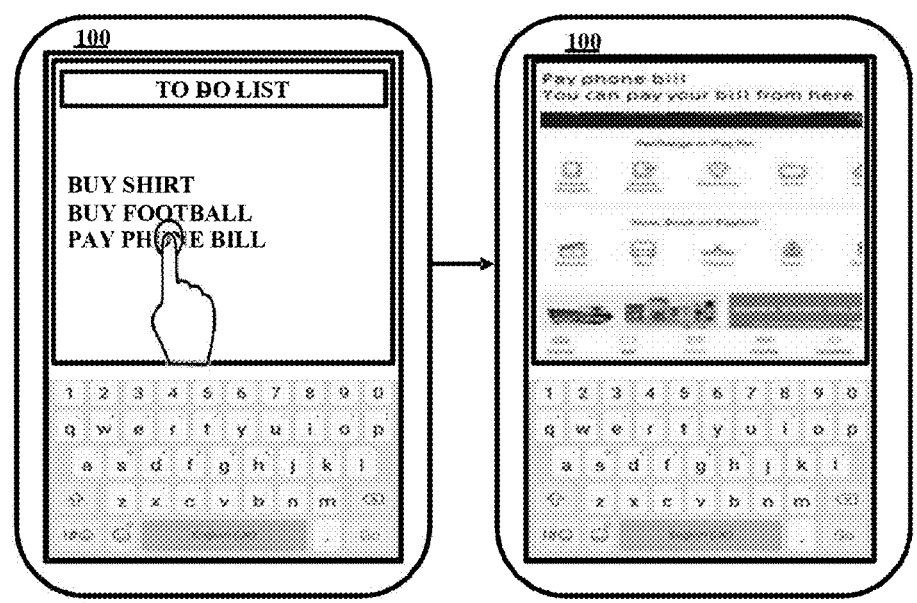
FIG. 13 is an example schematic user interface for explaining a method of providing suggestions based on context-based tag from a to-do-list, according to an embodiment.

FIG. 13 is an example schematic user interface for explaining a method of providing suggestions based on context-based tag from a to-do-list, according to an embodiment.

Referring to FIG. 13, three tasks of 'Buy a shirt', 'Buy a football' and 'Pay phone bill' is saved in a reminder application. Further 'shopping app 1' tagged with a context-based tag of 'shirt', 'shopping app 2' tagged with a context-based tag of 'football', and 'payment app 1' tagged with a context-based tag of 'phone bill' may be installed on the electronic device 100.

According to an embodiment, keywords may be extracted from a to-do list of the reminder application to determine a corresponding data item using context-based tags. Accordingly, a task suggestion may be provided by the electronic device 100 when a corresponding data item is opened in the electronic device 100.

In an embodiment, a personalized suggestion may be provided by the electronic device 100 based on the tasks saved in the reminder data item. For example, a task of 'Pay phone bill' may be associated with 'payment app 1' using the extracted tag of 'phone bill'. When 'payment app 1' is opened, the electronic device 100 may provide a suggestion of paying phone bill through a notification. In an embodiment, the electronic device 100 may push the notification for opening 'payment app 1' to pay the phone bill.

Figure 14A:
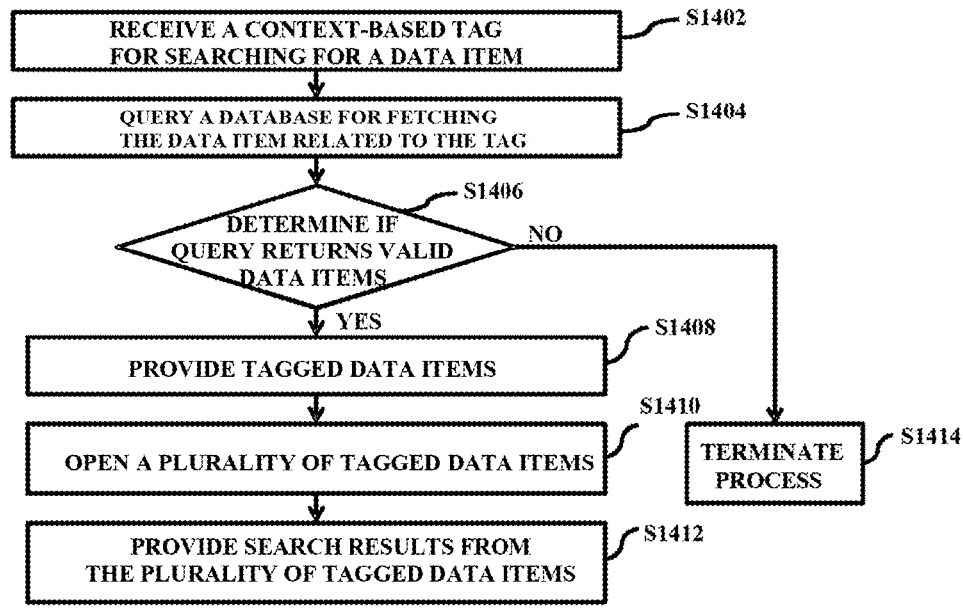
FIG. 14A is a flowchart of a method of providing search results from a plurality of tagged data items, according to an embodiment.

FIG. 14A is a flowchart of a method of providing search results from a plurality of tagged data items, according to an embodiment.

Referring to FIG. 14A, at S1402, an input (i.e., a context-based tag) may be received at an electronic device for searching for a data item. In an embodiment, a context-based search engine may receive the input for searching the data item.

At S1404, a context-based tag database may be queried for fetching a data item related to the specific context-based tag.

At S1406, whether the database query returns valid data items may be determined. When the database query does not return valid data items, at S1414, the process may be terminated.

When the database query returns valid data items, at S1408, tagged data items may be provided by the electronic device.

At S1410, a plurality of tagged data items may be opened at the electronic device. In an embodiment, all of the tagged data items may be opened at the electronic device.

At S1412, search results of the plurality of data items may be provided.

Further, comparison of the search results conducted by the plurality of data items may be provided. In an embodiment, the comparison may include availability of products, price, brand, size availability, etc.

Figure 14B:
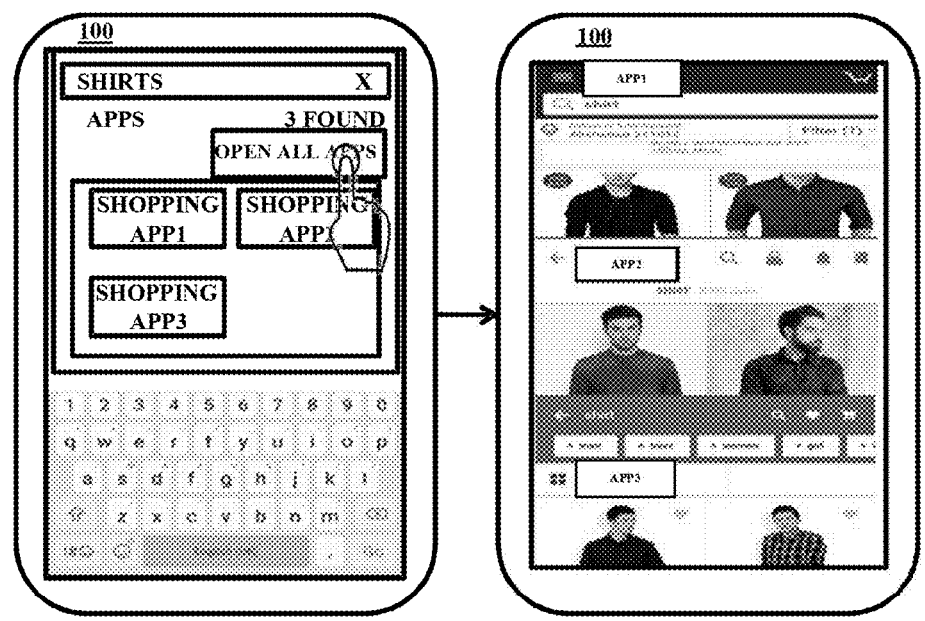
FIG. 14B is an example schematic user interface for explaining the method of FIG. 14A.

FIG. 14B is an example schematic user interface for explaining the method of FIG. 14A.

Referring to FIG. 14B, "Shirts" is entered in an integrated search bar of an electronic device 100, and a list of data items "Shopping app 1", "Shopping app2", "Shopping app3," etc. which were tagged with the context-based tag of "Shirts" may be displayed as a result of an integrated search on the electronic device 100. When an option of 'Open all apps' is selected in the electronic device, all data items associated with the context-based tag of "Shirts" are opened in the electronic device 100, and each search result performed by each data item is provided by the electronic device 100. Further, comparison of search results by all the data items including Shopping App 1, Shopping App 2, and Shopping App 3 may be provided together by the electronic device 100.

Figure 15:
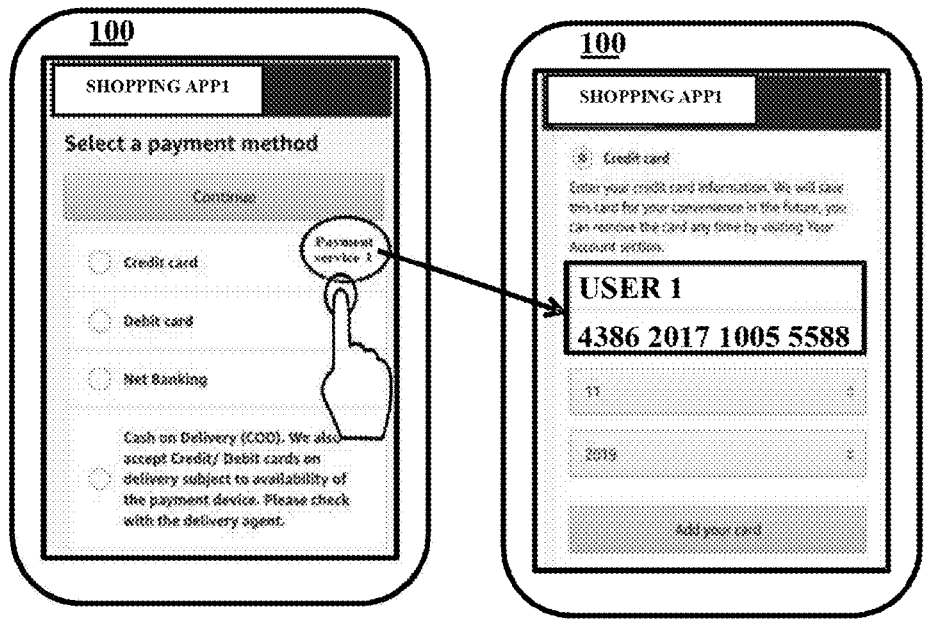
FIG. 15 is an example schematic user interface for explaining a method of tagging based on user's usage, according to an embodiment.

FIG. 15 is an example schematic user interface for explaining a method of tagging based on user's usage, according to an embodiment.

Referring to FIG. 15, 'Shopping app 1' is tagged with a context-based tag of 'Shopping'. A user of the electronic device 100 may wish to use payment information fetched by a payment service app 1 and the payment service app 1 may automatically fetch details of a payment card used before and ask the user to complete a payment transaction in Shopping app 1.

Figure 16:
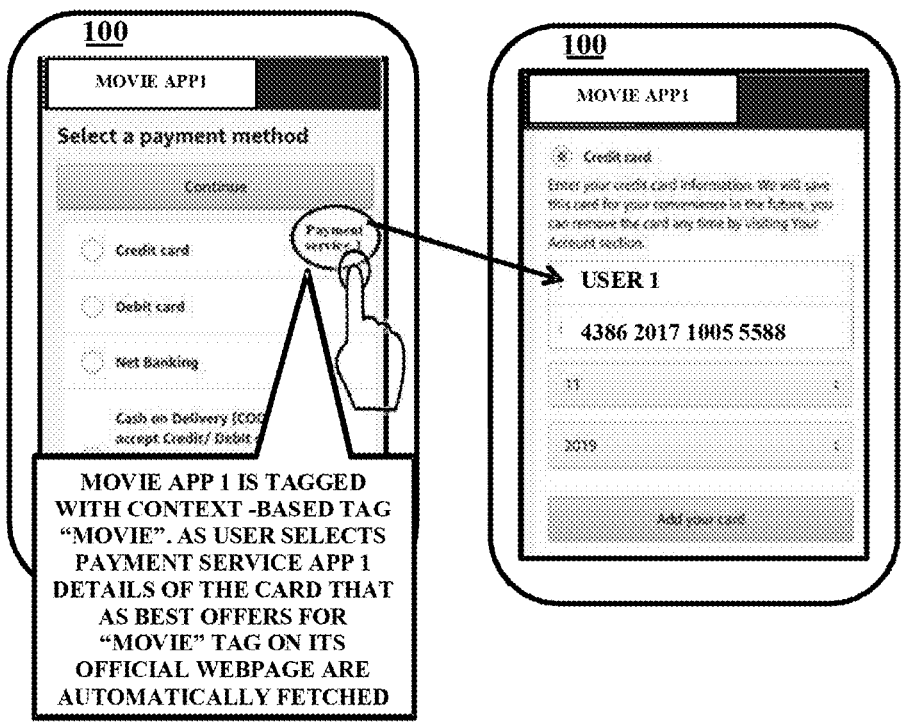
FIG. 16 is an example schematic user interface for explaining a method of providing suggestions, according to an embodiment.

FIG. 16 is an example schematic user interface for explaining a method of providing suggestions, according to an embodiment.

Figure 17:
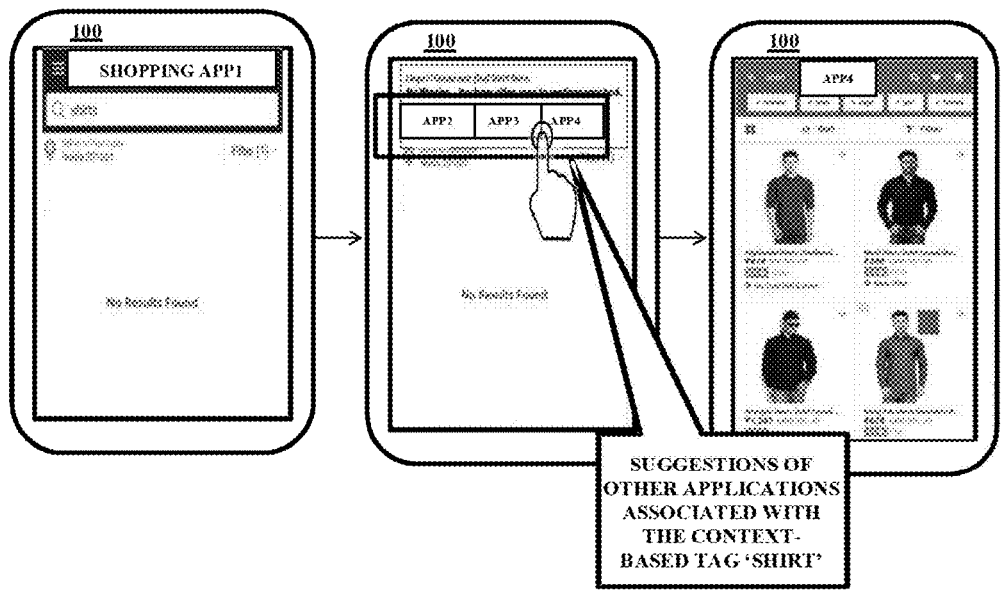
FIG. 17 is an example schematic user interface for explaining a method of providing suggestions of other applications based on a context-based tag, according to an embodiment.

Referring to FIG. 16, when Payment service app 1 is accessed then the payment service app 1 may automatically fetch the details of card that has best offers for "Movie" tag on its official webpage. Accordingly, credit/debit cards appropriate for each case may be suggested to a user. FIG. 17 is an example schematic user interface for explaining a method of providing suggestions of other applications based on a context-based tag, according to an embodiment.

Referring to FIG. 17, "Shirts" is searched for in Shopping app 1 on an electronic device 100, but no results found for "Shirts". Here, the electronic device 100 may identify a context-based tag of "Shirts" and use the context-based tag of "Shirts" to identify other applications tagged with the context-based tag of "Shirts". The electronic device 100 may provide a list of applications tagged with the context-based tag "Shirts" as a notification, which allows a user to find desired products without finding and opening each application.

Figure 18A:
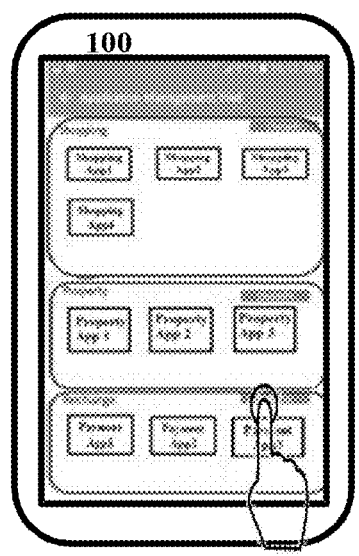
FIGS. 18A and 18B are example schematic user interfaces for explaining a method of uninstalling an application based on a context-based tag, according to an embodiment.
Figure 18B:
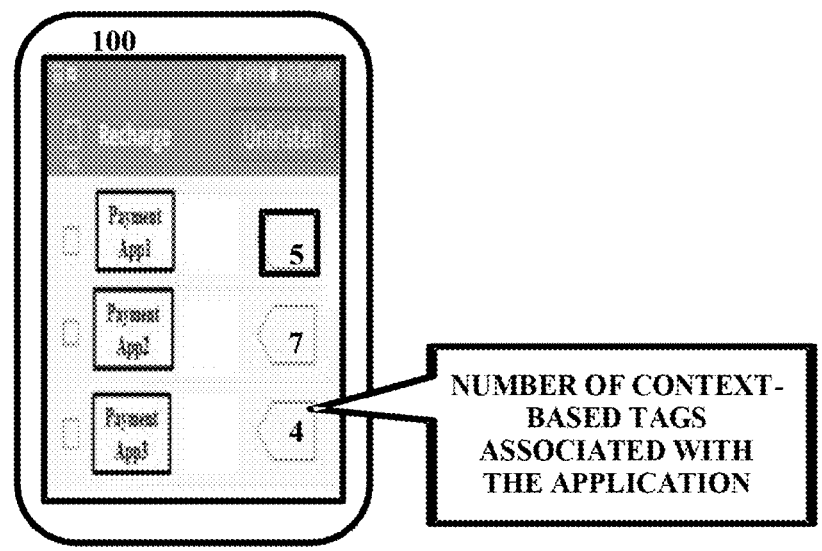

FIGS. 18A and 18B are example schematic user interfaces for explaining a method of uninstalling an application based on a context-based tag, according to an embodiment.

When an electronic device 100 encounters lack of storage space, the electronic device 100 may recommend uninstalling some applications. A list of applications to be uninstalled may be provided based on the last usage of the applications. Further, uninstalling the applications based on the last usage may lead to uninstalling necessary applications. For example, when a user used a shopping application a month ago and uninstalled all the shopping applications based on recommendation provided by the electronic device 100, the user need to re-install some of the shopping applications to buy a product.

Referring to FIG. 18A, an electronic device 100 may uninstall applications based on context-based tags and usage of the applications. For example, the electronic device 100 may group shopping app1, shopping app2, shopping app3, and shopping app4 tagged with 'Shopping' into a category 'Shopping'. A category may include property, recharge, travel, gourmet, navigation, movie, music, book, and the like.

Further, when the electronic device 100 encounters lack of storage space, the electronic device 100 may provide a list of grouped applications based on the categories as shown in FIG. 18A to efficiently uninstall applications.

In an embodiment, a category of applications a user wants to uninstall may be selected. On selecting the category of applications, the electronic device 100 may provide a list of applications under the category of 'recharge' along with numbers of tags associated with each of the applications as shown in FIG. 18B. For example, Payment App 1, Payment App 2, and Payment App 3 are tagged with 5, 7, and 4 context-based tags, respectively.

Figure 19:
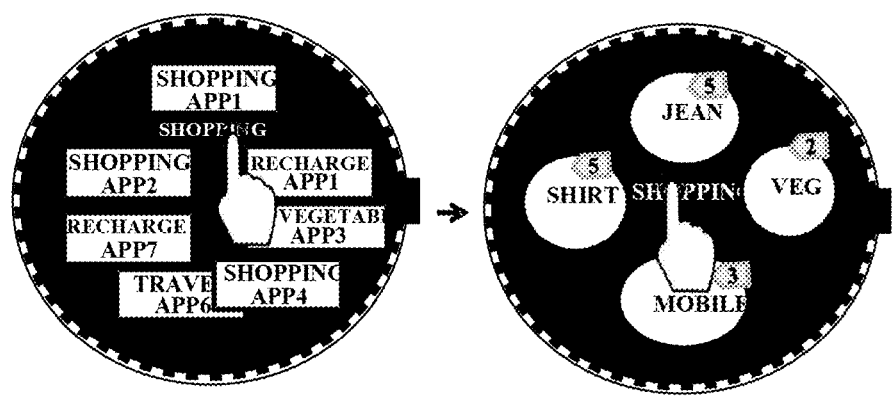
FIG. 19 is an example schematic user interface for a wearable device, according to an embodiment.

FIG. 19 is an example schematic user interface for a wearable device, according to an embodiment.

In general, a screen of a wearable device is relatively small. When the wearable device has many applications, a user may have difficulty to access a certain application to perform a specific task, which degrades the user experience.

For example, when a user wants to buy jeans, the user needs to find a shopping application by browsing through all the applications in the small screen of the wearable device. According to an embodiment, applications are categorized based on context-based tags, that is, all the applications tagged with the context-based tag of 'jeans' may be grouped in one category. Therefore, an application may be easily found even on the wearable device by using context-based tags. That is, the user may select the context-based tag of 'jeans' to get a list of shopping applications which sells jeans according to an embodiment.

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein may be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the embodiments as described herein.

What is claimed is:

1. A method comprising:
   extracting app context information including search keywords that are input by a user into a plurality of applications;
   associating a plurality of context-based tags with the extracted app context information;
   in response to receiving a user input:
      determining whether at least one context-based tag among the plurality of context-based tags corresponds to the user input; and
      based on determining that the at least one context-based tag corresponds to the user input, displaying a recommendation to use at least one application corresponding to the at least one context-based tag;
   based on opening the at least one application, retrieving at least one search result based on the at least one context-based tag corresponding to the at least one application; and
   displaying the at least one search result of the at least one application.

2. The method of claim 1, wherein the displaying the recommendation to use the at least one application includes at least one of:
   displaying a recommendation list including the recommendation to use the at least one application; or
   displaying a pop-up window including the recommendation to use the at least one application.

3. The method of claim 1, further comprising: opening the at least one application on an electronic device.

4. The method of claim 1, wherein the displaying the recommendation to use the at least one application comprises displaying multiple recommendations to use different applications corresponding to the at least one context-based tag, and
   the method further comprises displaying a comparison between the different applications.

5. The method of claim 1, wherein the user input comprises at least one of text selected in an electronic device, a search-keyword entered in the electronic device, or a text item that is saved.

6. The method of claim 1, wherein the plurality of context-based tags are associated with the extracted app context information in response to determining that the extracted app context information is valid for associating the plurality of context-based tags with the extracted app context information.

7. The method of claim 1, further comprising:
   determining at least one contact associated with the at least one context-based tag; and
   displaying the at least one contact.

8. The method of claim 7, wherein the at least one contact is displayed by opening the at least one application.

9. The method of claim 7, wherein the at least one contact associated with the at least one context-based tag is determined based on communications between the user and the at least one contact.

10. An electronic device comprising:
    at least one processor configured to:
       extract app context information including search keywords that are input by a user into a plurality of applications;
       associate a plurality of context-based tags with the extracted app context information;
       in response to receiving a user input:
          determine whether at least one context-based tag among the plurality of context-based tags corresponds to the user input; and based on determining that the at least one context-based tag corresponds to the user input, control a display to display a recommendation to use at least one application corresponding to the at least one context-based tag;

based on opening the at least one application, retrieve at least one search result based on the at least one context-based tag corresponding to the at least one application; and display the at least one search result of the at least one application.

11. The electronic device of claim 10, wherein the at least one processor is further configured to:

control the display to open the at least one application.

12. The electronic device of claim 10, wherein the at least one processor is further configured to:

control the display to display the recommendation to use the at least one application by controlling the display to display multiple recommendations to use different applications, and control the display to display a comparison between the different applications.

13. The electronic device of claim 10, wherein the user input comprises at least one of text selected in the electronic device, a search-keyword entered in the electronic device, or a text item that is saved.

14. The electronic device of claim 10, wherein the plurality of context-based tags are associated with the extracted app context information in response to determining that the extracted app context information is valid for associating the plurality of context-based tags with the extracted app context information.

15. The electronic device of claim 10, wherein the at least one processor is further configured to:

determine at least one contact associated with the at least one context-based tag; and control the display to display the at least one contact.

16. A computer program product comprising a non-transitory computer readable storage medium having a computer readable program stored therein, the computer readable program, when executed by a processor of an electronic device, causing the electronic device to:

extract app context information including search keywords that are input by a user into a plurality of applications;

associate a plurality of context-based tags with the extracted app context information;

in response to receiving a user input:

determine whether at least one context-based tag among the plurality of context-based tags corresponds to the user input; and based on determining that the at least one context-based tag corresponds to the user input, display a recommendation to use at least one application corresponding to the at least one context-based tag;

based on opening the at least one application, retrieve at least one search result based on the at least one context-based tag corresponding to the at least one application; and display the at least one search result of the at least one application.

\* \* \* \* \*